United States Patent [19]
Wake et al.

[11] Patent Number: 5,788,191
[45] Date of Patent: Aug. 4, 1998

[54] HALF-PLOW VORTEX GENERATORS FOR ROTOR BLADES FOR REDUCING BLADE-VORTEX INTERACTION NOISE

[75] Inventors: Brian E. Wake, Portland; T. Alan Egolf, Glastonbury; Peter F. Lorber, Coventry; Anton J. Landgrebe, South Windsor, all of Conn.

[73] Assignee: Sikorsky Aircraft Corporation, Stratford, Conn.

[21] Appl. No.: 517,026

[22] Filed: Aug. 18, 1995

[51] Int. Cl.$^6$ .................................................. B64C 23/06
[52] U.S. Cl. ........................................... 244/199; 244/200
[58] Field of Search .............................. 244/199, 130, 244/200, 198

[56] References Cited

U.S. PATENT DOCUMENTS

| | | | |
|---|---|---|---|
| 2,800,291 | 7/1957 | Stephens | 244/200 |
| 4,354,648 | 10/1982 | Schenk et al. | 244/199 |
| 5,058,837 | 10/1991 | Wheeler | 244/199 |

FOREIGN PATENT DOCUMENTS

| | | | |
|---|---|---|---|
| 806206 | 7/1949 | Germany | 416/236 |

OTHER PUBLICATIONS

"Force Mixing in Boundary Layers" by G.B. Schubauer and W.G. Spangenberg *National Bureau of Standard Report* Aug. 8, 1958.

"The Use of Vortex Generators to Delay Boundary Layer Separation" by D.G. Gould, National Aero Establishment Report LR-183 Dec. 19, 1956.

*Primary Examiner*—Andres Kashnikow
*Assistant Examiner*—Tien Dinh
*Attorney, Agent, or Firm*—Terrance J. Radke

[57] ABSTRACT

In one embodiment for a helicopter main rotor assembly, a half-plow vortex generator is mounted in combination with the upper aerodynamic surface of each main rotor blade and is operative to generate a primary corotating vortex of sufficient strength to interact with and accelerate the dissipation of the tip vortex generated by the same main rotor blade, thereby reducing blade-vortex interaction noise radiating from the helicopter main rotor assembly. The half-plow vortex generator has a right triangular planform configuration defined by a length, a width, and an apex angle. The three-dimensional configuration of the vortex generator is further defined by an apex height. The apex height is the primary determinant of the strength of the generated primary corotating vortex and is defined in terms of the thickness of the main rotor blade at the local chord where the vortex generator is mounted. The apex height may be approximately equal to the local thickness, but preferably has a magnitude within the range of about one-eighth to about three-quarters of the local thickness. The length, width, and apex angle are secondary determinants of the strength of the primary corotating vortex generated by the half-plow vortex generator. The length and width of the vortex generator are defined in terms of the tip chord length of the main rotor blade, the length preferably having a magnitude within the range of about one-fourth to one-half of the tip chord length and the width preferably having a value of about one-third of the length of the vortex generator. The apex angle preferably has a value within the range of about twenty to about thirty degrees. The mounting site for the half-plow vortex generator is defined in terms of the length of the local and tip chords, respectively. The vortex generator is mounted inboardly from the tip of the main rotor or blade a spanwise distance having a magnitude preferably within the range of about one-half of to about equal to the tip chord length in substantial alignment with the local chord. The apex of the vortex generator is mounted inwardly from the leading edge of the main rotor blade by a chordal distance having a magnitude of about one-quarter the local chord length.

16 Claims, 3 Drawing Sheets

HALF-PLOW VORTEX GENERATORS FOR ROTOR BLADES FOR REDUCING BLADE-VORTEX INTERACTION NOISE

TECHNICAL FIELD

The present invention is directed to a means for reducing the noise radiated from rotating blades, and more specifically, to half-plow vortex generators that are mounted in passive or active combination with rotor blades, especially helicopter main rotor blades, and operative to reduce the blade-vortex interaction noise radiated from such rotor blades.

BACKGROUND OF THE INVENTION

One concern of helicopter designers is to reduce, to the extent practicable, the noise radiating from the main rotor assembly of a helicopter during flight operations. For helicopter flight operations, a significant noise level is radiated during low speed, descending flight profiles, i.e., a descent mode, associated with landing operations. The noise generated during the descent mode may be particularly objectionable inasmuch as landing flight operations typically occur in populated areas. A paramount component of the noise radiated from a helicopter during the low speed, descending flight profile is due to blade-vortex interaction (BVI) noise.

During typical helicopter flight operations, the rotation of the rotor blades of the main rotor assembly, due to the airfoil profile (and angle of attack) thereof, creates a high velocity, low pressure field over the upper aerodynamic surface of each rotor blade and a low velocity, high pressure field over the lower aerodynamic surface of each rotor blade, i.e., positive loading over the rotor blade span. The pressure differential acting upon the rotor blades provides the necessary lift forces for helicopter flight operations. Unfortunately, this pressure differential also causes the generation of vortices at the tips of the rotor blades.

At the tip of each rotor blade this pressure differential effectively engenders airflow circulation from the low pressure field to the high pressure field to create a tip vortex. The tip vortex is shed from the rotor blade and collides with a trailing rotor blade during low speed, descending flight profiles (BVI noise radiation is generally not as much of a concern in other flight profiles due to the interrelationship among the freestream airflow, the rotation f the main rotor blades, and/or the orientation of the rotor disk defined by the rotating main rotor blades). The collision of the tip vortex with the trailing rotor blade induces impulsive airloading on the trailing rotor blade, creating acoustic pressure waves that are the source of BVI noise. The BVI noise signature of a helicopter is directly related to the magnitude of the peak-to-peak velocity across the core of the generated tip vortex.

In addition to the generation of BVI noise as described hereinabove, the tip vortices generated by the main rotor blades also impinge upon the other main rotor blades, the tail rotor blades, the tail section and the fuselage sections of the helicopter downstream of the main rotor assembly. The impingement of the tip vortices with these sections induces vibrations therein, thereby increasing the overall vibration level of the helicopter.

The helicopter designer, therefore, attempts, to the extent practicable taking into account, inter alia, weight, cost, efficiency, and complexity effects, to incorporate elements into the helicopter main rotor assembly that mitigate the BVI noise radiated therefrom. There are several different design options to mitigate BVI radiated noise. One design approach involves the incorporation of a tip configuration for the main rotor blade that reduces the strength of the generated tip vortex.

One design configuration involves a forward swept rotor blade wherein the vortex is generated inboardly of the tip, such inboardly generated vortex being more diffuse, i.e., reduced strength, than the tip vortex generated by a convention rotor blade planform. Another design configuration is a sub-wing tip wherein a sub-wing is attached to the rotor blade at the tip thereof to produce two weak, corotating vortices that mix far downstream and diffuse due to viscous effects. While these design options may be generally effective in mitigating the BVI noise radiated from a helicopter main rotor assembly, such design options may degrade the overall operating efficiency of the main rotor assembly. Furthermore, such design options may be difficult and/or costly to effect from a fabrication standpoint.

Another design approach involves the incorporation of tabs or flaps to mitigate BVI noise. Stationary tabs can be incorporated on the trailing edge of the main rotor blade at the tip thereof. While such tabs may be effective in reducing BVI noise by disrupting the formation of tip vortices, such tabs incur a drag penalty, thus reducing the operational efficiency of the main rotor assembly (by requiring that extra power be delivered to the main rotor assembly to offset the profile drag losses).

A further design approach involves active control of the angle of attack of the rotor blades. Oscillating flaps may be located inboard of the tip of the main rotor blade to provide a means of actively controlling the angle of attack of the rotor blade. Alternatively, a higher harmonic control scheme may be implemented by rapidly varying the pitch of the rotor blades, or the pitch of individual rotor blades may be controlled. By actively varying the angle of attack of the rotor blades, the loading of the rotor blade may be controlled to reduce the strength of the generated tip vortex or the position of the trailing rotor blade relative to a shed tip vortex.

Yet another design approach involves channeling air to the tip of the main rotor blade and expelling such air to disrupt the formation of the tip vortex. Like the design approaches discussed in the preceding paragraphs, this design approach may be relatively effective in mitigating the BVI noise radiating from the main rotor assembly. However, of all the discussed design approaches, this approach is the most disadvantageous in terms of weight penalty, increased complexity and cost, and decreased reliability and operating efficiency of the main rotor system.

A need exists to provide a means of reducing the BVI noise radiated from rotor blades, and in particular, from the main rotor blades of a helicopter main rotor assembly. The means should not significantly impair the operating efficiency of the main rotor assembly, e.g., increased power requirements or increased profile drag, and should not result in a significant increase in the weight, cost, reliability, or complexity of the main rotor assembly.

DISCLOSURE OF THE INVENTION

One object of the present invention is to provide a half-plow vortex generator for use with a rotor blade, particularly a helicopter main rotor blade, that is operative to generate a primary corotating vortex of sufficient strength to interact with and accelerate the dissipation of the tip vortex generated by the same rotor blade.

Another object of the present invention is to provide a half-plow vortex generator having a right triangular planform configuration that is defined by a length, a width, and an apex angle, and an apex height, which in combination with the length, width, and apex angle, defines the three-dimensional configuration of the half-plow vortex generator.

A further object of the present invention is to provide a half-plow vortex generator that is mountable in combination with an aerodynamic surface of the rotor blade with the length thereof in substantial alignment with a local chord of the rotor blade.

Yet another object of the present invention is to provide a half-plow vortex generator wherein the apex height has a magnitude defined in terms of the local thickness of the rotor blade at the local chord, the length has a magnitude defined in terms of the tip chord length, and the width has a magnitude defined in terms of the tip chord length.

Still a further object of the present invention is to provide a half-plow vortex generator mounted inboardly from the tip of the rotor blade a predetermined spanwise distance therefrom wherein the predetermined spanwise distance is defined in terms of the tip chord length and wherein the half-plow vortex generator is further mounted inwardly from the leading edge of the rotor blade by a predetermined chordal distance wherein the predetermined chordal distance is defined in terms of the local chord length.

These and other objects of the present invention are achieved by a vortex generator system for use with a rotor blade, particularly a helicopter main rotor blade, defined by a tip chord that comprises a half-plow vortex generator having a right triangular planform which is defined by a length, a width, and an apex angle. The half-plow vortex generator further comprises an apex height, which in combination with the length, width, and apex angle, defines the three-dimensional configuration of the half-plow vortex generator. The half-plow vortex generator is mountable in combination with an aerodynamic surface of the rotor blade with the length thereof in substantial alignment with a local chord of the rotor blade.

The apex height of the half-plow vortex generator has a magnitude that is defined in terms of the local thickness of the rotor blade at the local chord. The length and width of the half-plow vortex generator have magnitudes defined in terms of the tip chord length.

The half-plow vortex generator is mounted inboardly from the tip of the rotor blade a predetermined spanwise distance that is defined in terms of the tip chord length. The half-plow vortex generator is further mounted inwardly from the leading edge of the rotor blade by a predetermined chordal distance that is defined in terms of the local chord length.

BRIEF DESCRIPTION OF THE DRAWINGS

A more complete understanding of the present invention and the attendant features and advantages thereof may be had by reference to the following detailed description when considered in conjunction with the accompanying drawings wherein.

BEST MODES FOR CARRYING OUT THE INVENTION

Figure 1:
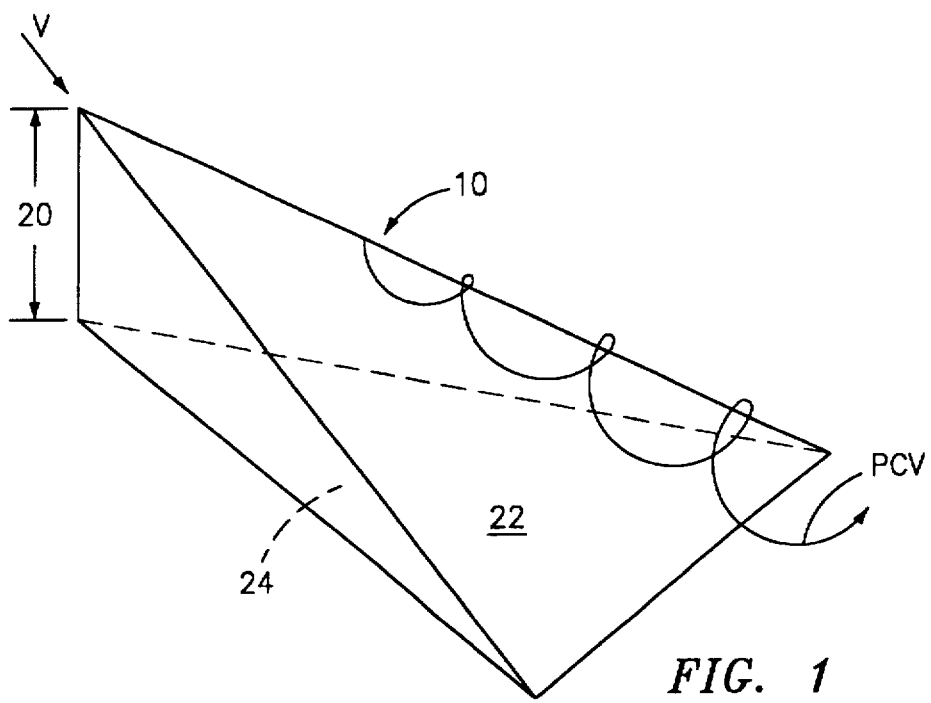
FIG. 1 is a perspective view of a half-plow vortex generator according to the present invention.
Figure 2:
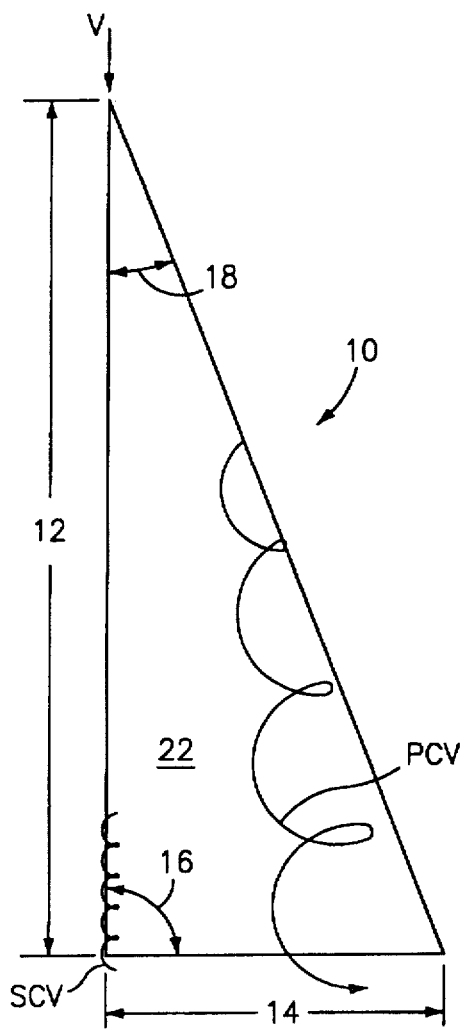
FIG. 2 is a top plan view of the half-plow vortex generator of FIG. 1.

Referring now to the drawings wherein like reference characters identify corresponding or similar elements throughout the several views, FIGS. 1–2 illustrate a "half-plow" vortex generator 10 according to the present invention for a helicopter main rotor assembly. While the vortex generator 10 according to the present invention is described herein in terms of the main rotor blades of a helicopter main rotor assembly, one skilled in the art will appreciate that the vortex generator 10 may have utility for use in combination with other types of rotating blades.

Figure 4:
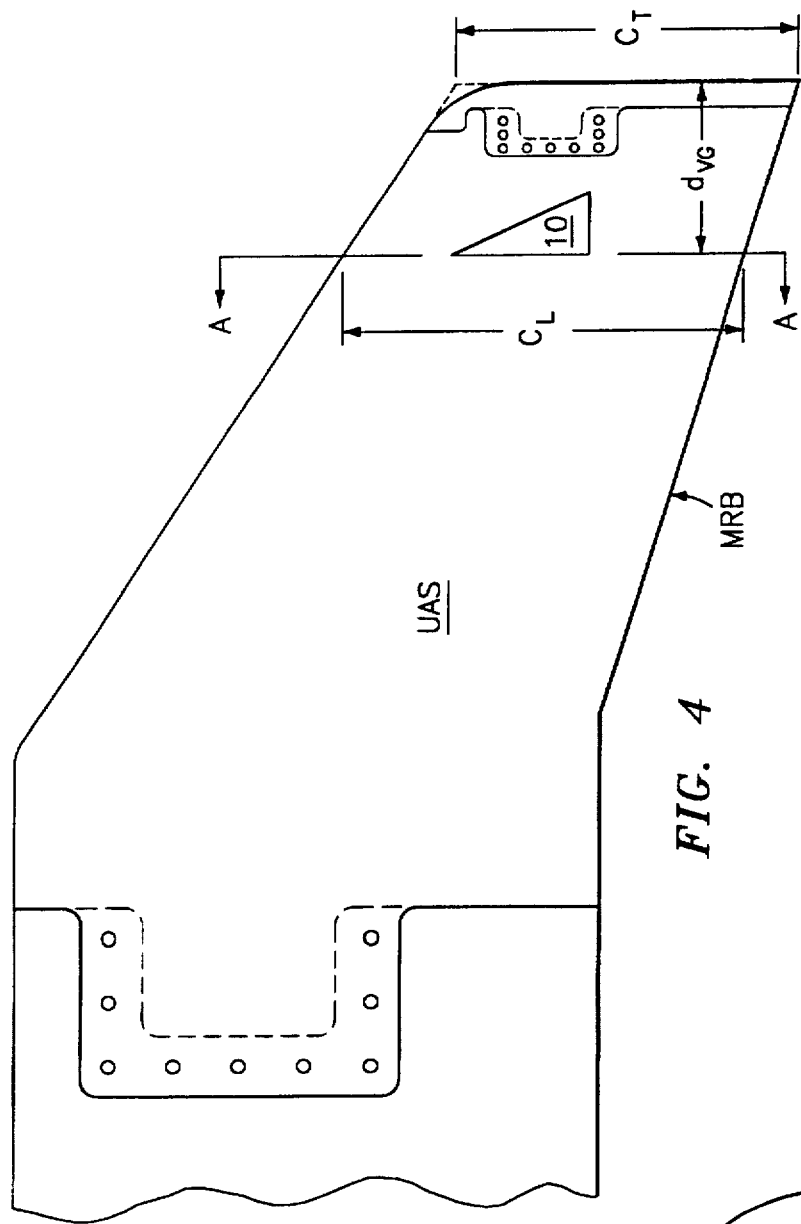
FIG. 4 is a top plan view of the tip end of an exemplary main rotor blade illustrating one use of the half-plow vortex generator according to the present invention wherein the vortex generator is mounted in combination with the upper aerodynamic surface of the exemplary main rotor blade.
Figure 5:
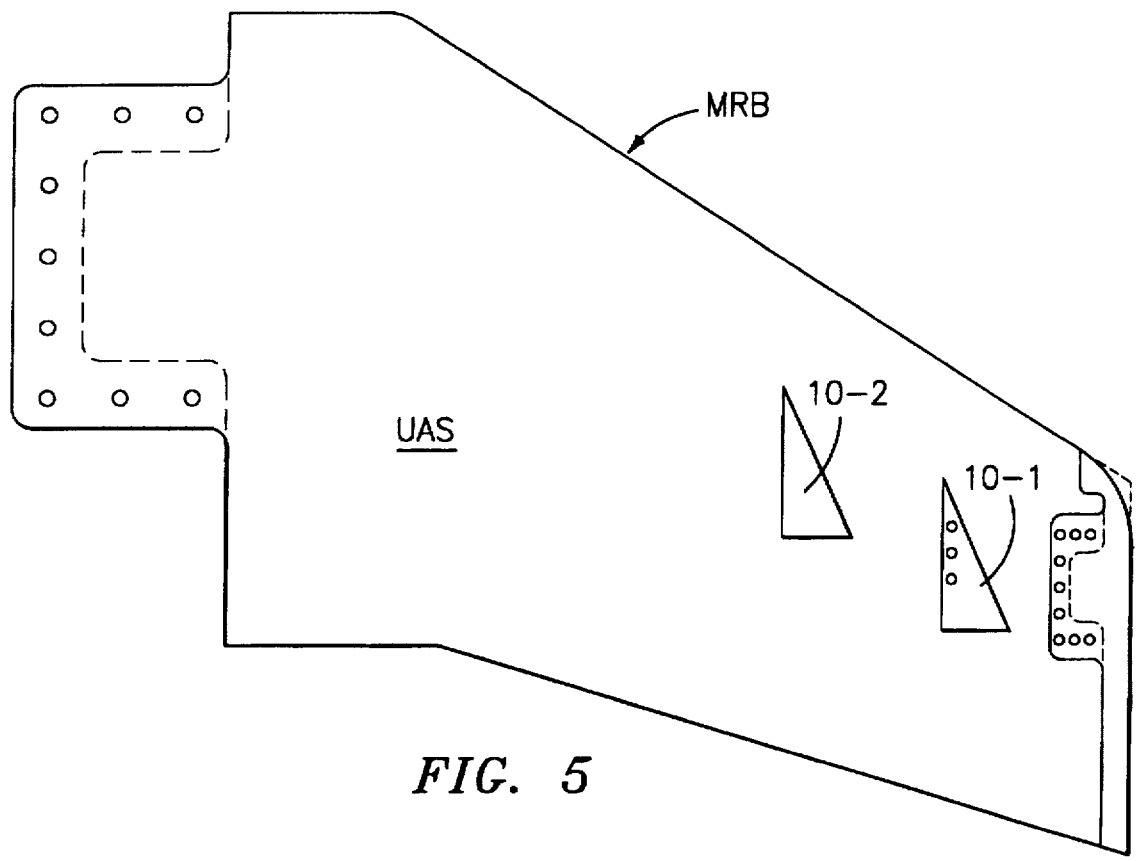
FIG. 5 is a top plan view of the tip end of an exemplary main rotor blade illustrating another use of the half-plow vortex generator according to the present invention wherein first and second vortex generators are mounted in combination with the upper aerodynamic surface of the exemplary main rotor blade.

At least one half-plow vortex generator 10 is mounted in combination with the aerodynamic surface (preferably the upper aerodynamic surface) of each main rotor blade of a helicopter main rotor assembly at the tip thereof (see, e.g., FIGS. 4–5). The vortex generator 10 is operative to generate a primary corotating vortex (the "corotating" terminology is used herein to indicate that the generated primary vortex PCV has the same sense of airflow circulation as the tip vortex, e.g., counterclockwise; the generated primary corotating vortex is indicated by the reference characters PCV in FIGS. 1, 2 while the reference character V defines the freestream airflow interacting with the half-plow vortex generator 10 that interacts with the tip vortex formed by the some main rotor blade. During typical descent flight operations of the helicopter, the tip of the main rotor blade is subjected to positive loading, and the tip vortex generated as a result of such positive tip loading is designated as a positive tip vortex. An examination of FIG. 2 shows that the half-plow vortex generator 10 also generates a secondary corotating vortex SCV.

The primary corotating vortex PCV generated by the vortex generator 10 has a strength, where strength is defined by the magnitude of the peak-to-peak velocity across the vortex core, i.e., Vpp, that is approximately equal to or slightly greater than, i.e., within the range of 1.0<Vpp<1.2, the strength of the positive tip vortex formed by the same main rotor blade. The primary corotating vortex PCV interacts by airflow mixing and merges with the positive tip vortex formed by the same main rotor blade to cause accelerated dissipation of the merged vortices due to viscosity, i.e., the strength of the merged vortices is significantly reduced. The reduced strength of the positive tip vortex, in turn, reduces the BVI noise radiated by the trailing main rotor blade since the impulse airloading on the trailing main rotor blade is diminished as a result of the abated strength of the positive tip vortex. In addition to BVI noise reduction, the reduced strength of the positive tip vortex, due to the operation of the half-plow vortex generator 10 according to the present invention, also results in an overall reduction of the variation levels of the helicopter since the vibrations induced by positive tip vortices upon the other main rotor blades, the tail rotor blades, the fuselage and tail sections of the helicopter are concomitantly reduced.

The secondary corotating vortex SCV generated by the vortex generator 10 also interacts (by airflow mixing) and merges with the positive tip vortex. However, inasmuch as the strength of the secondary corotating vortex SCV is much less than the strength of the primary corotating vortex PCV, the secondary corotating vortex SCV is not a significant contributing factor in BVI noise reduction such that its effects may generally be ignored.

It is estimated that the use of half-plow vortex generators 10 according to the present invention results in a fifty percent reduction in the peak-to-peak velocity of the positive tip vortex formed by each main rotor blade, thereby providing about a 3 dB reduction in the overall BVI noise level radiated by a helicopter main rotor assembly.

With reference to FIG. 2, the vortex generator 10 has a right triangle planform configuration defined by a length 12, a width 14, a ninety degree angle 16, and an apex angle 18. The three-dimensional configuration of the vortex generator 10 is further defined, with reference to FIG. 1, by an apex height 20, a backface surface 22, and an interface surface 24. The "half-plow" terminology is used to describe the vortex generator 10 based upon the foregoing configurational characteristics (as contrasted with a "full-plow" configuration, i.e., isosceles triangle planar configuration having an equal length but wherein the apex angle and the width are twice the magnitude of a corresponding half-plow configuration). The half-plow configuration is functionally superior to a "full plow" configuration inasmuch as the full-plow configuration generates two vortices, a counter-rotating vortex and a corotating vortex, that are effectively counterproductive in effect, i.e., not as effective in dissipating the tip vortex generated by the same rotor blade. In addition, the half plow configuration weighs less than a co, responding full-plow configuration. More importantly, the half-plow configuration exhibits lower profile drag characteristics than a corresponding full plow configuration.

Figure 3:
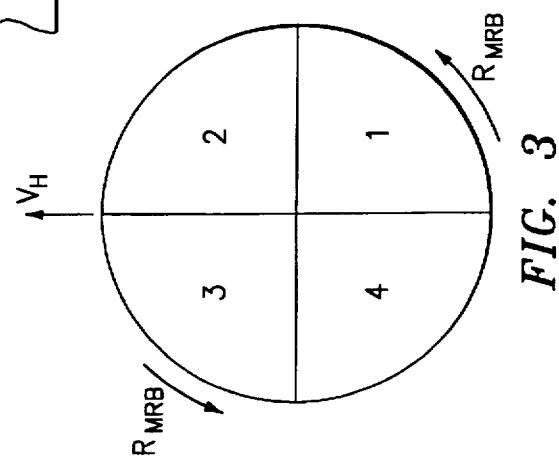
FIG. 3 is a top plan view (looking downwardly) of the rotor disk defined by the rotation of the main rotor blades of a helicopter main rotor assembly.

Any source of profile drag associated with the main rotor assembly, e.g., the main rotor blades, degrades the operational efficiency of the main rotor assembly. Accordingly, the design engineer generally performs a tradeoff analysis to determine whether the functional benefits associated with a design improvement for a main rotor assembly outweighs the profile drag associated with such design improvement. Referring to FIG. 3, which is a downward view of the rotor disk defined by the rotating main rotor blades (reference character $R_{MRB}$ defines the direction of rotation of the main rotor blades, i.e., counterclockwise, and reference character $V_H$ defines the direction of movement of the helicopter), it has been determined that the most significant component of BVI radiated noise is produced in the first quadrant of the rotor disk. This component of BVI radiated noise is a result of tip vortices that are generated by the rotating main rotor blades in the second quadrant and that interact with the trailing main rotor blades in the first quadrant. This phenomenon is due to the particular interrelationship between the freestream airflow and the rotating main rotor blades in the second quadrant. It was recognized that the effectiveness of each vortex generator 10 according to the present invention in reducing BVI radiated noise is primarily due to the functioning thereof in the second quadrant, i.e., the primary corotating vortices PCV generated in the second quadrant. In the first, third, and fourth quadrants, concomitantly, each vortex generator 10 is primarily acting as a source of profile drag losses. The half-plow vortex generator 10 having a three-dimensional configuration as described herein is a particularly effective design configuration for effectively reducing BVI radiated noise while concomitantly minimizing profile drag losses experienced by the main rotor assembly.

The vortex generator 10 of the present invention is preferably formed from a material that is inert with respect to the material comprising the aerodynamic surface of the main rotor blade, e.g., no galvanic reaction between the vortex generator 10 and the main rotor blade, that has sufficient mechanical strength to withstand the aerodynamic forces acting on the main rotor blade, e.g., freestream airflow, particulate matter such as dust or water, and that has a low density to mitigate the effect of the centrifugal force acting thereon (effects of centrifugal force are directly proportional to weight). For example, for main rotor blades fabricated from a composite material, the vortex generator 10 can be fabricated from the corresponding resinous matrix material comprising the composite material, e.g., a thermoset or thermoplastic material. For metallic main rotor blades, e.g., aluminum aerodynamic surfaces, the vortex generator 10 may be fabricated from a compatible metallic material, e.g., aluminum, or a thermoset or thermoplastic material that is inert with respect to the metallic aerodynamic surface.

The vortex generator 10 is fabricated using a suitable, conventional manufacturing technique. The vortex generator 10 may be fabricated from the selected material as a hollow, three-dimensional structure and filled with a lower density material, e.g., polyurethane foam, for structural integrity while concomitantly reducing the weight of the vortex generator 10 (and concomitantly, the overall system weight of the main rotor assembly).

Figure 4A:
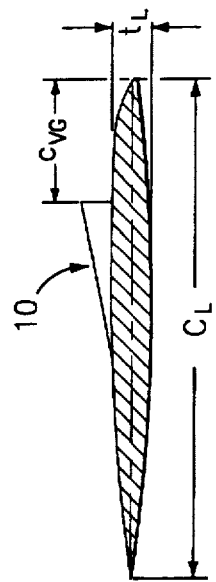
FIG. 4A is a cross-sectional view of the exemplary main rotor blade of FIG. 4 taken along line A—A thereof.

The configurational parameters that define the half-plow vortex generator 10, i.e., length 12, width 14, and height 20, are based upon the parameters of the main rotor blade, e.g., tip chord length $C_T$, local chord length $C_L$, and local blade thickness $t_L$, which the vortex generator 10 is mounted in combination with (see FIGS. 4, 4A). The height 20 of the vortex generator 10 is the critical parameter inasmuch as the height 20 is not only the primary determinant of the strength of the primary corotating vortex PCV generated by the vortex generator 10, but also defines the profile drag losses associated with the vortex generator 10. The height 20 of the vortex generator 10 also determines the manner in which the vortex generator 10 is mounted in combination with the aerodynamic surface of the main rotor blade.

There are two schemes for mounting the vortex generator 10 in combination with the main rotor blade, depending primarily on the height 20 of the vortex generator 10: passive or active. Preferably, the vortex generator 10 is mounted in passive combination with the aerodynamic surface of the main rotor blade by an appropriate technique, e.g., bonding or mechanically securing the interface surface 24 of the vortex generator 10 to the aerodynamic surface of the main rotor blade. In the passive scheme, the vortex generator 10 is permanently exposed to and interacts with the freestream airflow over the main rotor blade. The passive scheme has the advantages of being low weight, simple, inexpensive, highly reliable, and readily installed in combination with the main rotor blade. On the negative side, however, since the vortex generator 10 continuously interacts with the freestream airflow over the main rotor blade, profile drag losses are experienced in all four quadrants of the rotor disk.

In the active scheme, the vortex generator 10 is mounted in rotatable combination (at the width 14 edge thereof) with respect to the aerodynamic surface of the main rotor blade such that the vortex generator 10 is deployable. The vortex generator 10 is deployed so that the vortex generator 10 is only intermittently exposed to and interactive with the freestream airflow over the main rotor blade. In one active deployment scheme, the vortex generator 10 is fully deployed for the limited time period during which the helicopter is operating in a flight condition wherein significant BVI noise is being radiated from the main rotor assembly. In a variation on the foregoing active deployment scheme, the vortex generator 10 is intermittently deployed during the limited time period so that the vortex generator 10 is only exposed during rotation of the main rotor blade in the second quadrant. While the active scheme significantly reduces profile drag losses due to the vortex generator 10 since the vortex generator 10 is only deployed intermittently, i.e., pragmatically, profile drag losses are experienced only during the limited time period or only in the first, third, and fourth quadrants of the rotor disk in the limited time period. The active deployment scheme incurs a weight penalty, is more complex, more costly, less reliable, and gives rise to installation complexities as contrasted with the passive scheme. For example, the aerodynamic surface of each main rotor blade must be fabricated to include a receptacle for housing the vortex generator 10 in the retracted position, and an actuating means, e.g., electromagnetic, piezoelectric, magnetostrictive, shape-memory alloy, piston, must be disposed in combination with the vortex generator 10 to provide for the deployment and retraction of the vortex generator 10.

The height 20 of the vortex generator 10 is defined by the local thickness $t_L$ of the main rotor blade at the local chord $C_L$ (see FIGS. 4, 4A) wherein the vortex generator 10 is mounted to the aerodynamic surface of the main rotor blade. While the vortex generator 10 may have a height 20 approximately equal to the local blade thickness, i.e., about $1.0 t_L$, a preferable range for the height 20 of the vortex generator 10 is about $\frac{1}{8} t_L <$ height $20 < \frac{3}{4} t_L$, and more preferably about $\frac{1}{2} t_L$. One strong consideration in selecting the appropriate height 20 of the vortex generator 10 for use in combination with a main rotor blade is the magnitude of the Reynolds number of the freestream airflow over the main rotor blade. Generally, a vortex generator 10 having a height within the preferable range described hereinabove is sufficient for generating a primary corotating vortex PCV with sufficient strength to significantly abate the positive tip vortex generated by the same main rotor blade.

The length 12, width 14, and apex angle 18 of the vortex generator 10 are secondary determinants that define the strength of the primary corotating vortex PCV generated by the vortex generator 10. The length 12 of the vortex generator 10 is defined by length of the tip chord $C_T$ of the main rotor blade. The length 12 is preferably within the range of about $\frac{1}{4} C_T <$ length $12 < \frac{1}{2} C_T$. The width 14 of the vortex generator 10 is about one-third of the length 12, i.e., defined by the ratio width 14/length 12 approximately equal to one-third. The apex angle 18 of the vortex generator 10 is preferably within the range of about $20° <$ apex angle $18 < 30°$, and the described embodiment has an apex angle 18 of about 23°.

The mounting site, i.e., spanwise distance from the tip of the main rotor blade and chordal distance from the leading edge of the main rotor blade, of the vortex generator 10 is defined in terms of the length of the tip chord $C_T$ and the length of the local chord $C_L$, respectively, of the main rotor blade. With reference to FIG. 4, the length 12 edge of the vortex generator 10 is positioned inboardly a spanwise distance $d_{VG}$ from the tip of the main rotor blade. The spanwise distance $d_{VG}$ is selected to ensure that the primary corotating vortex PCV generated by the vortex generator 10 sufficiently interacts with the complementary tip vortex to significantly reduce the strength thereof before interaction with the trailing main rotor blade. Preferably, the spanwise distance $d_{VG}$ is within the range of about $\frac{1}{2} C_T < d_{VG} < 1 C_T$. Preferably, the length 12 edge of the vortex generator 10 is aligned with the local chord $C_L$, although a minor skewing of the length 12 edge with respect to the local chord $C_L$ does not significantly degrade the functional efficiency of the vortex generator 10, i.e., the strength of the generated primary corotating vortex PCV. The apex of the vortex generator 10 is positioned inwardly a chordal distance $C_{VG}$ from the leading edge of the main rotor blade (see FIG. 4A). Preferably, the chordal distance $C_{VG}$ is about one quarter of the length of the local chord $\frac{1}{4} C_L$, i.e., $C_{VG} \approx \frac{1}{4} C_L$.

FIGS. 4, 4A illustrate one use of the half-plow vortex generator 10 according to the present invention wherein the vortex generator 10 has configurational characteristics as described hereinabove and is mounted in combination with the upper aerodynamic surface UAS of the main rotor blade MRB as described in the preceding paragraph. The interface surface 24 of the vortex generator 10 may be complementary to the upper aerodynamic surface UAS of the main rotor blade MRB to facilitate passive mounting of the vortex generator 10 in combination with the main rotor blade MRB. Alternatively, the backface surface 22 may be complementary to the upper aerodynamic surface UAS to facilitate active mounting of the vortex generator 10 in combination with the main rotor blade MRB. The vortex generator 10 is operative to generate a primary corotating vortex to interact with the positive tip vortex produced by the same main rotor blade MRB to reduce the strength thereof such that BVI noise is diminished.

FIG. 5 illustrates another use of the half-plow vortex generator 10 according to the present invention wherein a first half-plow vortex generator 10-1 has the configurational characteristics and is mounted in combination with the upper aerodynamic surface UAS of the main rotor blade as described in the preceding paragraphs. A second half-plow vortex generator 10-2 having configurational characteristics similar to the first half-plow vortex generator 10-1 is mounted inboardly of the first half-plow vortex generator 10-1. The mounting site for the second half-plow vortex generator 10-2 is generally as described hereinabove except that the spanwise distance of the second half-plow vortex generator 10-2 is referenced from the first half-plow vortex generator 10-1 (rather than the tip of the main rotor blade).

It has been determined that under certain helicopter flight conditions, e.g., high speed forward flight with an advance ratio greater than 0.1 75, the tip of the main rotor blade is subject to negative loading and positive loading occurs inboardly of the tip in the second quadrant. As a result of the negative tip loading and positive inboard loading experienced by the main rotor blade, the main rotor blade generates dual, counter-rotating vortices wherein the tip vortex is negative and the inboard vortex is positive. The positive inboard vortex is approximately three to five times as strong as the negative tip vortex.

The dual vortex generator 10 scheme described immediately hereinabove is designed to provide BVI noise abatement for those flight conditions wherein dual, counter-rotating vortices are generated by the main rotor blade. Preferably, the first half-plow vortex generator 10-1 is passively mounted in combination with the upper aerodynamic surface UAS of the main rotor blade MRB (see FIG. 5 wherein bolted connections provide the mechanical securement of the first vortex generator 10-1 in combination with the main rotor blade MRB) inasmuch as the first half-plow vortex generator 10-1 is also functional to provide BVI noise abatement during other flight conditions, e.g., the descent mode. The second half-plow vortex generator 10-2 may be actively mounted to reduce the profile drag effects thereof during flight conditions wherein dual counter-rotating vortices are not formed.

Figure 6:
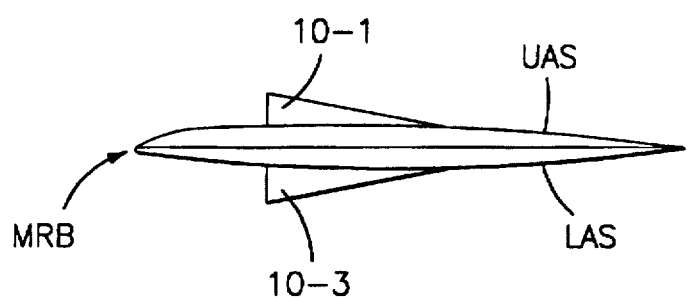
FIG. 6 is an end plan view of the tip end of an exemplary main rotor blade illustrating yet a further use of the half-plow vortex generator according to the present invention wherein vortex generators are symmetrically mounted (same radial station) in combination with the upper and lower aerodynamic surfaces of the exemplary main rotor blade.

FIG. 6 illustrates yet another use of the half-plow vortex generator 10 according to the present invention. A first half-plow vortex generator 10-1 having the configurational characteristics described hereinabove is mounted in combination with the upper aerodynamic surface UAS of the main rotor blade MRB as described hereinabove. A second half-plow vortex generator 10-3 having the configurational characteristics described hereinabove is mounted in combination with the lower aerodynamic surface LAS of the main rotor blade MRB. The second half-plow vortex generator 10-3 is mounted along the same local chord $C_L$ as the first half-plow vortex generator 10-1, i.e., symmetrical mounting. While FIG. 6 illustrates a symmetrical mounting scheme for the first and second half-plow vortex generators 10-1, 10-3, it will be appreciated that the first and second half-plow vortex generators may also be asymmetrically mounted within the constraints of the spanwise distance $d_{VG}$ described hereinabove.

A variety of modifications and variations of the present invention are possible in light of the above teachings. It is therefore to be understood that, within the scope of the appended claims, the present invention may be practiced otherwise than as specifically described hereinabove.

What is claimed is:

1. A vortex generator system for use with a rotor blade defined by a tip chord, comprising:

a half-plow vortex generator having a right triangular planform configuration;

said right triangular planform configuration being defined by a length, a width, and an apex angle; and an apex height, which in combination with said length, said width, and said apex angle of said right triangular planform configuration, defines the three-dimensional configuration of said half-plow vortex generator; and wherein said half-plow vortex generator is mountable in combination with an aerodynamic surface of the rotor blade with said length thereof in substantial alignment with a local chord of the rotor blade;

said apex height of said half-plow vortex generator having a magnitude defined in terms of the local thickness of the rotor blade at said local chord;

said length of said half-plow vortex generator having a magnitude defined in terms of said tip chord length;

said width of said half-plow vortex generator having a magnitude defined in terms of said tip chord length; and wherein said half-plow vortex generator is mounted inboardly from the tip of the rotor blade a predetermined spanwise distance from the tip of the rotor blade, said predetermined spanwise distance being defined in terms of said tip chord length, and wherein said half-plow vortex generator is further mounted inwardly from the leading edge of the rotor blade by a predetermined chordal distance, said predetermined chordal distance being defined in terms of said local chord length.

2. The vortex generator system of claim 1 wherein said magnitude of said apex height is approximately equal to the local thickness of the rotor blade at said local chord.

3. The vortex generator system of claim 1 wherein said magnitude of said apex height is within the range of about one-eighth to about three-quarters of the local thickness of the rotor blade at said local chord.

4. The vortex generator system of claim 1 wherein said magnitude of said apex height is approximately one-half the local thickness of the rotor blade at said local chord.

5. The vortex generator system of claim 1 wherein said magnitude of said length is within the range of about one-quarter to about one-half of said local chord length.

6. The vortex generator system of claim 1 wherein said magnitude of said width is about one-third of said magnitude of said length of said half-plow vortex generator.

7. The vortex generator system of claim 1 wherein said apex angle has a value within the range of about twenty degrees to about thirty degrees.

8. The vortex generator system of claim 1 wherein said apex angle has a value of about twenty-three degrees.

9. The vortex generator system of claim 1 wherein said predetermined spanwise distance has a magnitude within the range of about one-half of to about equal to said tip chord length.

10. The vortex generator system of claim 1 wherein said predetermined chordal distance has a magnitude approximately equal to one-quarter of said local chord length.

11. The vortex generator system of claim 1 wherein said aerodynamic surface is an upper aerodynamic surface and wherein said half-plow vortex generator is passively mounted in combination with said upper aerodynamic surface.

12. The vortex generator system of claim 1 wherein said aerodynamic surface is an upper aerodynamic surface and wherein said half-plow vortex generator is actively mounted in combination with said upper aerodynamic surface.

13. The vortex generator system of claim 1 wherein said half-plow vortex generator is defined as a first half-plow vortex generator, and wherein said vortex generator system further comprises a second half-plow vortex generator mounted in combination with the rotor blade, said second-half plow vortex generator including an apex height having a magnitude defined in terms of the local thickness of the rotor blade at said local chord, a length having a magnitude defined in terms of said tip chord length, a width having a magnitude defined in terms of said tip chord length, and an apex angle.

14. The vortex generator system of claim 13 wherein said aerodynamic surface is an upper aerodynamic surface and wherein said first and second half-plow vortex generators are mounted in combination with said upper aerodynamic surface.

15. The vortex generator system of claim 13 wherein said aerodynamic surface is an upper aerodynamic surface and wherein said first half-plow vortex generator is mounted in combination with said upper aerodynamic surface, and further wherein said second half-plow vortex generator is mounted in combination with said lower aerodynamic surface of the rotor blade in symmetrical relation to said first half-plow vortex generator.

16. A half-plow vortex generator for use in mounted combination with a rotor blade defined by a tip chord, comprising:

a right triangular planform configuration being defined by a length, a width, and an apex angle; and an apex height, which in combination with said length, said width, and said apex angle of said right triangular planform configuration, defines the three-dimensional configuration of said half-plow vortex generator; and wherein said half-plow vortex generator is mountable in combination with an aerodynamic surface of the rotor blade with said length thereof in substantial alignment with a local chord of the rotor blade;

said apex height of said half-plow vortex generator having a magnitude within the range of about one-eighth to about three-quarters of the local thickness of the rotor blade at said local chord;

said length of said half-plow vortex generator raving a magnitude within the range of about one-quarter to about one-half of said tip chord length;

said width of said half-plow vortex generator having a magnitude of about one-third of said length;

said apex angle having a value within the range of about twenty degrees to about thirty degrees; and wherein said half-plow vortex generator is mounted inboardly from the tip of the rotor blade a predetermined spanwise distance having a magnitude within the range of about one-half of to about equal to said tip chord length, and wherein said half-plow vortex generator is further mounted inwardly from the leading edge of the rotor blade by a predetermined chordal distance having a magnitude of about one-quarter of said local chord length.

* * * * *